US006978217B2

(12) United States Patent
Morozumi et al.

(10) Patent No.: US 6,978,217 B2
(45) Date of Patent: Dec. 20, 2005

(54) DATA COLLECTION METHOD AND DEVICES THEREFOR

(75) Inventors: Akio Morozumi, Nagano (JP); Kanato Kobayashi, Minamazumi (JP); Chiaki Segi, Nagano (JP)

(73) Assignee: T&D Corporation, Nagano (JP)

( * ) Notice: Subject to any disclaimer, the term of this patent is extended or adjusted under 35 U.S.C. 154(b) by 42 days.

(21) Appl. No.: 10/487,710

(22) PCT Filed: Sep. 13, 2002

(86) PCT No.: PCT/JP02/09412

§ 371 (c)(1),
(2), (4) Date: Feb. 26, 2004

(87) PCT Pub. No.: WO03/025881

PCT Pub. Date: Mar. 27, 2003

(65) Prior Publication Data

US 2004/0243352 A1  Dec. 2, 2004

(30) Foreign Application Priority Data

Sep. 13, 2001 (JP) .............................. 2001-277875

(51) Int. Cl.$^7$ .............................................. G06F 19/00
(52) U.S. Cl. ...................... 702/122; 702/188; 455/344; 455/73; 340/539.1
(58) Field of Search ................................ 702/122, 188; 340/870.01, 870.16, 870.17, 438, 449, 500, 340/539.1; 455/344, 73; 370/277

(56) References Cited

U.S. PATENT DOCUMENTS

| | | | |
|---|---|---|---|
| 5,719,771 A * | 2/1998 | Buck et al. ............... | 455/456.5 |
| 5,867,801 A * | 2/1999 | Denny ......................... | 701/35 |
| 5,887,176 A * | 3/1999 | Griffith et al. ............... | 713/320 |
| 5,999,091 A * | 12/1999 | Wortham ..................... | 340/431 |
| 6,047,250 A * | 4/2000 | Beaudoin et al. ........... | 702/188 |
| 6,177,861 B1 | 1/2001 | MacLellan et al. | |
| 6,233,534 B1 * | 5/2001 | Morozumi et al. ......... | 702/176 |
| 6,441,728 B1 * | 8/2002 | Dixit et al. .................. | 340/447 |
| 6,453,687 B2 * | 9/2002 | Sharood et al. ............... | 62/127 |

(Continued)

FOREIGN PATENT DOCUMENTS

JP 09-102789 4/1997

(Continued)

*Primary Examiner*—Patrick J. Assouad
(74) *Attorney, Agent, or Firm*—Buchanan Ingersoll PC

(57) ABSTRACT

A data collection method of the present invention uses measuring terminals, each of measuring terminals can obtain measurement data from a sensor and wirelessly transmit the measurement data, and a collection terminal for receiving the measurement data from the measuring terminals, each measuring terminal having a memory that stores, as its own identification information, one of a limited number of sets of identification information whose order can be defined. The data collection method comprises: an inquiring step in which the collection terminal wirelessly transmits a message for inquiring about identification information; a first responding step in which each measuring terminal, on receiving the message, wirelessly transmits its own identification information when, after the message has ended, a turn for sending its own identification information is reached; a first identifying step in which the collection terminal stores the sets of identification information received in reply in the order of the sets of identification information; and a collecting step in which the collection terminal wirelessly communicates individually with the measuring terminals that have the stored sets of identification information and collects the measurement data from the measuring terminals. By the collection method, data can be automatically collected from the measuring terminals.

15 Claims, 5 Drawing Sheets

U.S. PATENT DOCUMENTS

| | | | | |
|---|---|---|---|---|
| 6,518,876 B1 * | 2/2003 | Marguet et al. | ............. | 340/447 |
| 6,519,529 B2 * | 2/2003 | Doyle | ............. | 701/213 |
| 6,553,336 B1 * | 4/2003 | Johnson et al. | ............. | 702/188 |
| 6,628,208 B1 * | 9/2003 | Morozumi et al. | ............. | 340/870.28 |
| 6,697,735 B2 * | 2/2004 | Doyle | ............. | 701/213 |
| 6,714,133 B2 * | 3/2004 | Hum et al. | ............. | 340/573.4 |
| 6,720,887 B1 * | 4/2004 | Zunti | ............. | 340/870.28 |
| 6,768,931 B2 * | 7/2004 | Takehara et al. | ............. | 700/225 |
| 6,822,562 B2 * | 11/2004 | Poirier et al. | ............. | 340/445 |
| 6,847,912 B2 * | 1/2005 | Forster | ............. | 702/130 |
| 6,865,516 B1 * | 3/2005 | Richardson | ............. | 702/188 |
| 2002/0000092 A1 * | 1/2002 | Sharood et al. | ............. | 62/127 |
| 2002/0011932 A1 * | 1/2002 | Rodgers et al. | ............. | 340/572.1 |
| 2002/0061758 A1 * | 5/2002 | Zarlengo et al. | ............. | 455/517 |
| 2003/0137968 A1 * | 7/2003 | Lareau et al. | ............. | 370/349 |
| 2004/0036626 A1 * | 2/2004 | Chan et al. | ............. | 340/870.17 |
| 2004/0041714 A1 * | 3/2004 | Forster | ............. | 340/870.17 |
| 2004/0113783 A1 * | 6/2004 | Yagesh | ............. | 340/568.1 |
| 2004/0174260 A1 * | 9/2004 | Wagner | ............. | 340/568.1 |

FOREIGN PATENT DOCUMENTS

JP      2000-049656      2/2000

* cited by examiner

DATA COLLECTION METHOD AND DEVICES THEREFOR

TECHNICAL FIELD

The present invention relates to a system for measuring and collecting physical quantities, such as temperature.

BACKGROUND ART

In order to manage the temperature of transported goods, a measuring terminal for periodically measuring the temperature is provided in a container. After the container has been opened, the provided measuring terminal is taken out, the recorded temperatures are collected, and it is confirmed whether there are any abnormalities.

However, in a method using such a measuring terminal, it is not possible to judge whether there are any abnormalities during transport without opening the container. Accordingly, it is not possible to detect abnormalities in a container beforehand from the data in a measuring terminal and to prevent such abnormalities from occurring from the outset. This means that regardless of whether a measuring terminal is provided in a container, it is still necessary to separately provide measuring terminals at a plurality of positions on a truck or a cargo hold and to measure environmental conditions such as temperature. Also, it is not possible to process a container during the transportation process even if an abnormal state has occurred.

If it is possible to wirelessly collect measurement data from a measuring terminal provided in a container, the measurement data recorded in the measuring terminal can be verified without opening the container. Accordingly, the problem described above can be solved. To do so, when a plurality of containers are being handled, in order to wirelessly communicate with the measuring terminals provided in the respective containers separately, it is necessary to obtain the identification information of the respective measuring terminals in advance. Accordingly, a measuring terminal needs to constantly transmit its own identification information or own identification information, and the collection terminal that corresponds to the base station needs to be able to obtain in advance the identification information of the measuring terminals to be managed by that collection terminal. However, since measuring terminals have repeatedly transmitted information, this means that power consumption has been high, which is not suitable for transportation over long periods.

It is possible to write the identification information of a measuring terminal on the outside of a container and to input the identification information into the collection terminal by any particular method. However, such inputting is troublesome and input errors may occur, so that this is not a very practical method.

OBJECTS AND SUMMARY

For the reasons given above, it is an object of the present invention to provide a system where the identification information of a measuring terminal provided in a container can be obtained by a simple method, so that the temperature of a container can be managed and it can be judged beforehand whether there is an abnormality in the container using the measurement data of the measuring terminal.

According to an embodiment of the present invention, identification information, such as identification numbers, whose order can be defined, are stored in the collection terminals. Self or own identification information is transmitted when the turn of the own identification information is reached following the reception of a message inquiring about identification information, the collection terminal automatically obtains the identification information of each of measuring terminals. A data collection method uses measuring terminals, each measuring terminal can obtain measurement data from a sensor and wirelessly transmit the measurement data, and a collection terminal, which can receive the measurement data from the measuring terminals, wherein each measuring terminal has a memory that stores one of a limited number of sets of identification information whose order is definable as own identification information for the measuring terminal. The data collection method comprises: an inquiring step in which the collection terminal wirelessly transmits a message for inquiring about identification information; a first responding step in which each measuring terminal, on receiving the message, wirelessly transmits its own identification information when, after the message has ended, a turn for sending the own identification information is reached; a first identifying step in which the collection terminal stores the sets of identification information responded in the order of the sets of identification information; and a collecting step in which the collection terminal wirelessly communicates individually with the measuring terminals with the sets of identification information stored and collects the measurement data from the measuring terminals.

With this collection method, the measuring terminal only need to use a wireless apparatus for receiving messages continuously or intermittently, so that a large reduction can be made in power consumption. Since individual sets of identification information are transmitted from the measuring terminals when the respective turns for sending such set of identification information are reached, the collection terminal does not need reception hardware or software for distinguishing between sets of identification information arriving simultaneously. Accordingly, the data collecting method uses an extremely simple transmission and reception method, and the identification information of the measuring terminals to be managed by the collection terminal are obtained automatically by simple hardware and software. Also, once the sets of identification information has been received, the collection terminal can communicate with the individual measuring terminals using these sets of identification information, so that the collection terminal can collect the measurement data that has been measured or is being measured by each measuring terminal. The collection terminal also can monitor the presence or absence of abnormalities, and can monitor the conditions where each measuring terminal is installed.

A measuring terminal that composes a system which uses this data collection method comprises: means for obtaining measurement data from a sensor; means for transmitting the measurement data via a wireless apparatus; a memory for storing one of a plurality of sets of identification information, whose order can be defined, as own identification information of the measuring terminal; and first responding means for transmitting the own identification information via the wireless apparatus when a message inquiring about identification information has been received via the wireless apparatus and a turn for transmitting the own identification information has been reached following an end of the message. A collection terminal that composes the system comprises: means for receiving, via a wireless apparatus, measurement data from measuring terminals that can obtain the measurement data from sensors; inquiring means for transmitting, via the wireless apparatus to the measuring terminals, a message that inquires about identification information; and first identifying means that stores sets of identification information received via the wireless apparatus in an order of the sets of identification information after an end of the message, wherein the means for receiving communicates with the measuring terminals with the stored sets of identification information individually via the wireless apparatus and collects the measurement data from the measuring terminals.

In a case where the measuring terminals are provided in containers loaded on a truck, the communication range of the wireless apparatuses may be small and so may be limited to around several meters, for example. When the communication range is limited, the number of measuring terminals that can communicate with the collection terminal is limited, so that the number of the sets of identification information to be included in the measuring terminals may also be limited and the time required by the first responding step can be reduced. In the case of a wide storage space, such as a cargo hold, by using wireless apparatuses with a communication range that is limited to around several tens of meters, the number of measuring terminals that can communicate with the collection terminal can also be limited. In addition, low output wireless apparatuses with a limited communication range makes power consumption reduce and is effective for extending the battery life of the measuring terminals.

It is preferable that each set of identification information includes first identification information for defining order and second identification information for identifying a group. In the inquiring step, a message that includes the second identification information is transmitted, in the responding step, the measuring terminals with the own identification information that include the second identification information included in the message responds to the message. Since the first identification information is appended to each set of second identification information, the number of sets of first identification information for identifying the measuring terminals can be limited. Also, even if the first identification information is not known, so long as the second identification information is known beforehand, by varying the first identification information in the sets of second identification information respectively, the sets of identification information can be obtained, so that the time required for the first responding step can be reduced.

In addition, it is effective to provide a second responding step, before the first responding step, in which every measuring terminal wirelessly transmits its own or self identification information simultaneously following the end of the message and a second identifying step where, when a set of identification information can be identified in the second responding step, the set of identification information is stored and the first identifying step is skipped. When only one measuring terminal is managed by the collection terminal, the identification information of this measuring terminal is obtained without waiting for the turn for transmitting the own identification information of that measuring terminal. Accordingly, the step of collecting the measurement data can start sooner. It is preferable for a measuring terminal to include a second responding means for transmitting the own identification information of the measuring terminal via the wireless apparatus a predetermined time after the end of the message and before the first responding means replies. In addition, it is preferable for the collection terminal to include a second identifying means for receiving, following the end of the message, sets of identification information that are simultaneously transmitted from every measuring terminal and, when a set of identification information can be identified, storing the set of identification information and skipping an operation of the first identifying means.

Also, by transmitting the same message a plurality of times together with a number of repetitions for the transmission when inquiring about identification information, the measuring terminals can receive the message and understand the timing of the end of the message, even when a method where reception is performed intermittently is used by the measuring terminals in a normal mode. Accordingly, it is possible to, extend the battery life.

When replying to a message, in view of the differences in the time kept by clocks provided in the individual measuring terminal, it is preferable for each measuring terminal to count a turn for transmitting its own identification information using a normal time for transmitting one set of identification information, the normal time being a total of a time needed to transmit the one set of identification information plus spare time. The simultaneous transmission by a plurality of measuring terminals can be avoided, and the collection terminal can reliably obtain the identification information.

The respective functions of the measuring terminal and the collection terminal can be provided as programs or program products, such as firmware, that are executed by processors, such as CPUs, that are provided in the respective terminals, with it also being possible for such programs or program products to be used having been recorded onto suitable recording media such as ROMs. In order to achieve the functions of the present invention using measuring terminals that are compact and disposable or have a similar construction, a program is provided that comprises an instruction that executes a step of transmitting, when a message inquiring about identification information has been received via the wireless apparatus, the own identification information of the measuring terminal via the wireless apparatus when, after the message has ended, a turn for sending the own identification information is reached. The functions of the collection terminal is provided as a program comprising instructions that can execute: a step of transmitting, via the wireless apparatus to the measuring terminals, a message that inquires about identification information; a step of storing, following an end of the message, sets of identification information received via the wireless apparatus in an order of the sets of identification information; and a step of communicating via the wireless apparatus with the measuring terminals with the stored sets of identification information individually and collecting the measurement data from the measuring terminals.

It is also preferable for a measuring terminal that houses a sensor and can transmit data measured by the sensor to comprise an optical communication means for receiving data for setting conditions for transmitting and receiving via the wireless apparatus. The measuring terminal that can transmit data via the wireless apparatus and data can be collected at a position away from the measuring terminals individually by indicating the identification information or changing the frequency. Therefore, it is not only easy to collect data from a plurality of measuring terminals but also possible, by providing an antenna internally, to use a seamless housing, so that measuring terminals can be made with a favorable seal, with high water resistance and weather resistance, and high durability. Accordingly, it is possible to provide measuring terminals that can be installed in environments with a variety of conditions.

On the other hand, in order to communicate via a wireless apparatus, it is necessary to set the frequency, to set the protocol, and to set the own identification information for identifying the individual measuring terminals, and to do so it is necessary to communicate with the individual measuring terminals separately. The simplest way of communicating with the separate measuring terminals is to make a wired connection between each measuring terminal and a host apparatus, such as a personal computer, that makes the settings, though in such case it is necessary to provide a suitable interface on the outside of the housing of each measuring terminal, resulting in a loss in seal performance which makes it difficult to achieve water resistance, etc. This is also the case when an operation panel, such as dip switches, is provided, so that it is not easy to make a measuring terminal durable.

For the above reason, it is preferable for the measuring terminals of the present invention to include, in addition to the wireless apparatus, a means that can communicate wirelessly and on a measuring-terminal-by-measuring-erminal basis using light or a magnetic field (magnetism) without being influenced by other measuring terminals, and for it to be possible for data for setting conditions for transmitting and receiving via the wireless apparatus to be received via this communication means that uses light or a magnetic field. In particular, an optical communication means can be constructed easily, at low cost, and compactly such as by combining a photodiode or photo-transistor with an LED, and being suited to a measuring terminal. Accordingly, by internally equipping a measuring terminal with a sensor, wireless apparatus, means for storing data and an optical communication means, it is possible to provide a measuring terminal that can make full use of the merits described above for the measuring terminal with internally provided wireless apparatus, and the merits of easily changing the identification information, etc., of the measuring terminal using the optical communication means. It is also preferable for the program that controls a measuring terminal to comprise, in addition to the step of transmitting data wirelessly, an instruction for executing a step that sets the identification information of the measuring terminal using the optical communication means.

With this kind of measuring terminal, it is possible to flexibly set the conditions of the measuring terminal via the optical communication means at a time when the measuring terminal is attached to the installed position or when the measuring terminal is provided into a package. Accordingly, the setting of measuring terminals are made freely in accordance with the system being measured by that measuring terminals, and the merits of introducing the measuring terminals can be obtained without changing the system to be measured.

PREFERRED EMBODIMENTS OF THE PRESENT INVENTION

Figure 1:
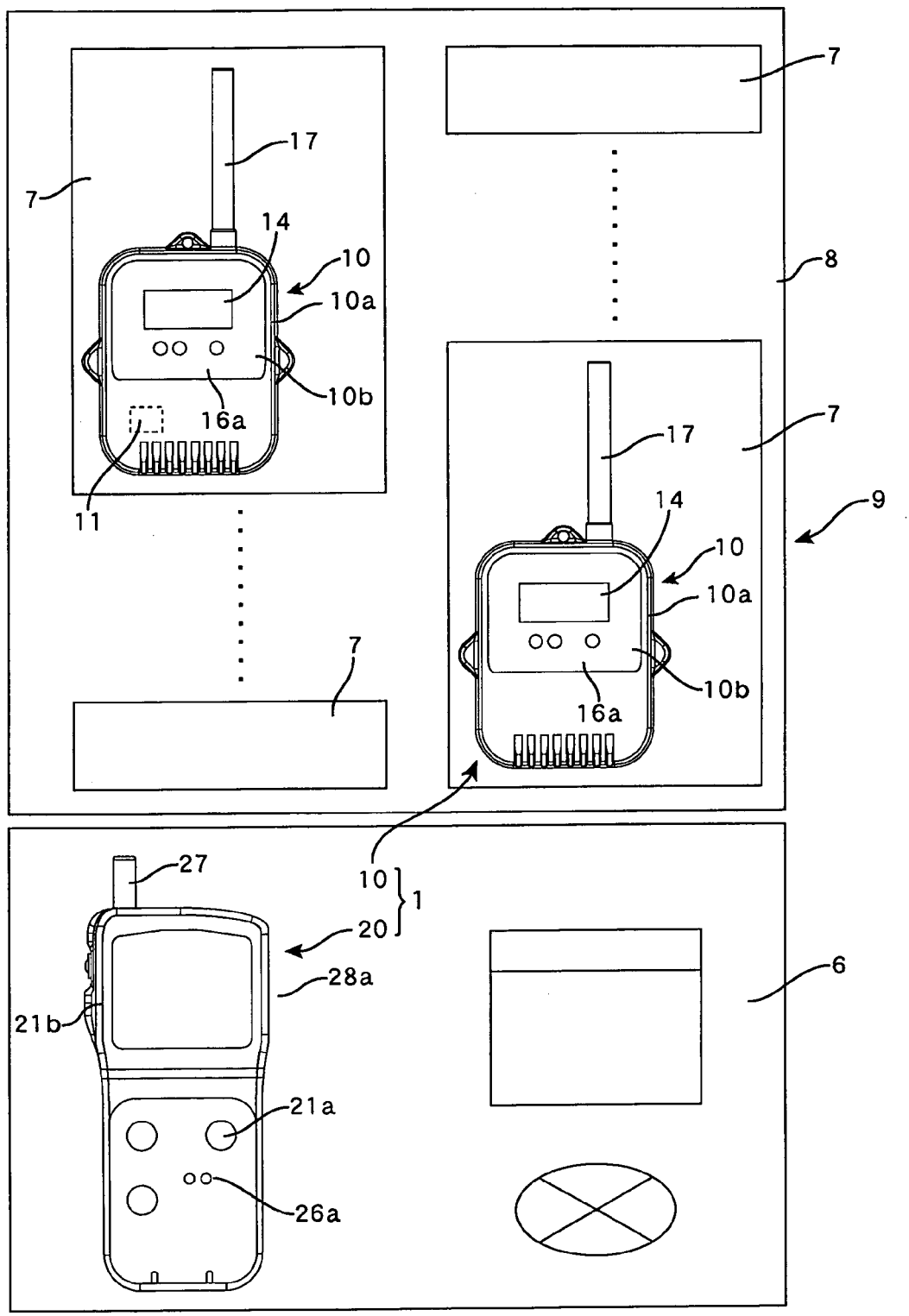
FIG. 1 shows an overview of a collection system according to an embodiment of the present invention.

The following describes embodiments of the present invention in more detail with reference to the attached drawings. FIG. 1 shows an overview of a data collection system 1 according to the present invention. The data collection system 1 includes a plurality of measuring terminals 10 and a collection terminal 20 that collects data from the plurality of measuring terminals 10. These measuring terminals 10 are referred to by names such as "measuring units", "data loggers" and "log terminals", and are respectively installed in a plurality of containers 7 loaded on a deck 8 of a truck 9, while the collection terminal 20 is mounted at a position that can be monitored by an operator, such as at a driver's seat 6. Each measuring terminal 10 is internally provided with a temperature sensor such as a thermistor, and can measure the internal temperature of a container 7 and record the measurement data in a memory. In addition, each measuring terminal 10 includes a wireless apparatus and through wireless communication with the collection terminal 20, the measurement data is collected in the collection terminal 20. Accordingly, by using the data collection system 1 of the present embodiment, the temperatures of each of the containers 7 can be collectively monitored at the driver's seat 6 without opening the containers 7. The collection terminal 20 may be realized by a dedicated device for collecting data from the measuring terminals 10 or can be realized by a multifunction terminal that includes a plurality of functions aside from the functions that relate to the present invention. The collection terminal 20 may be portable, or can be realized as a system that is fixed to the driver's seat or the like.

Figure 2:
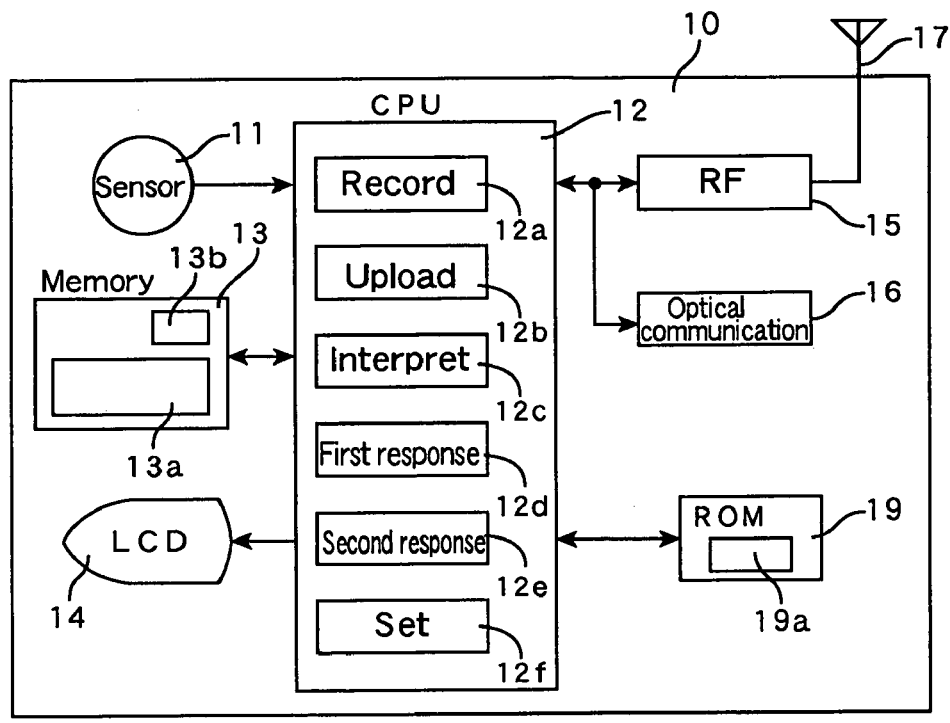
FIG. 2 is a block diagram showing the arrangement of the measuring terminal shown in FIG. 1.

FIG. 2 shows the overall construction of the measuring terminal 10. This measuring terminal 10 includes a sensor 11 that measures temperature of circumstance, a CPU 12 that controls the operation of the measuring terminal 10, a memory 13, a liquid crystal display (LCD) 14 that displays the temperature being measured, the operation mode, etc., an RF wireless unit 15 and antenna 17 that wirelessly communicate (via radio waves) with the collection terminal 20, and an optical communication unit 16 that communicates with the collection terminal 20 or a personal computer or the like using light, such as infrared light. By loading firmware 19a that is recorded in a ROM 19, the CPU 12 operates as a control apparatus that is equipped with functions such as a recording function 12a that records temperature data (measurement data) that has been measured by the sensor 11 in a measurement data storage part 13a of the memory 13, an uploading function 12b that transmits the recorded data to the collection terminal 20 via the wireless unit 15, an interpreting function 12c that interprets a message from the collection terminal 20, a first response function 12d that transmits an identification number (IDNo) 13b recorded in the memory 13 in response to such message when the turn for this identification number has been reached, a second response function 12e that transmits the identification number 13b when the message has ended, and a setting function 12f that sets the identification number and sets the frequency conditions and the like of the wireless unit 15 using data supplied via the optical communication unit 16.

As shown in FIG. 1, the measuring terminal 10 is constructed so that the devices described above are enclosed in a sealed housing 10a, with only the antenna 17 extending out of the housing 10a. Accordingly, the measuring terminal 10 is highly resistant to moisture and to corrosion, and so has high durability and various other tolerances. This means that the measuring terminal 10 can be easily installed in a container 7 that is used for transporting foodstuffs and other products. The LCD 14 and a port 16a for optical communication appear on a surface 10b, and the setting of the identification number, etc., can be made via optical communication.

The measuring terminal 10 transmits data via the wireless unit 15 so that data can be collected at a position away from the measuring terminal 10, and by indicating the identification information of separate measuring terminals, the collection terminal 20 can collect data from a plurality of measuring terminals. In order for the measuring terminals 10 to transmit and receive data to and from the collection terminal 20, it is necessary to set the radio frequency, to set the protocol, and/or to set the sets of identification information for identifying the separate measuring terminals 10, with such settings being made using the optical communication unit 16 for the terminals 10. The optical communication unit 16 is compactly constructed at low cost by combining a photo diode or a phototransistor for receiving data and an LED as a light source for transmitting data, and is a separate or personal communication means that is suited to a compact measuring terminal 10. In addition, such communication means has high directionality, so that information is not broadcast as in the case of radio waves (electromagnetic waves). Since data can be transmitted and received via a medium of light that is transmitted through air, there is no need to use components such as connectors for which water resistance and air-tightness are difficult to achieve. Therefore, the advantages of the sealed construction of the measuring terminal 10 can be maintained while making it possible to identify the measuring terminal 10 using the identification information and to flexibly and wirelessly set the conditions for the exchanging of data.

Figure 3:
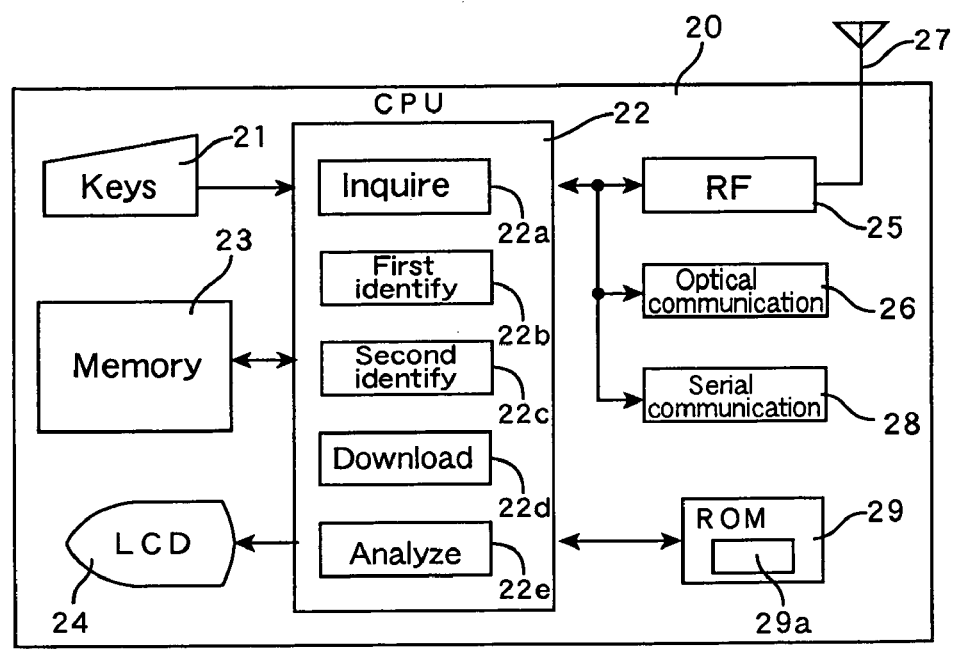
FIG. 3 is a block diagram showing the arrangement of the collection terminal shown in FIG. 1.

FIG. 3 shows the overall construction of the collection terminal 20. The collection terminal 20 includes operation keys 21, a CPU 22 that controls the operation of the collection terminal 20, a memory 23, an LCD 24 that displays the measured data and the operation state, etc., an RF wireless unit 25 and an antenna 27 that wirelessly communicate with the measuring terminal 10, an optical communication unit 26 that communicates with a measuring terminal 20 or a host computer using light, such as infrared light, and another communication unit 28, such as a USB port or RS232C port, for communicating with a host computer. By loading firmware 29a that is recorded in a ROM 29, the CPU 22 operates as a control apparatus that is equipped with functions such as an inquiry function 22a that transmits a message to measuring terminals 10 to inquire about identification numbers, a first identifying function 22b that recognizes the identification numbers transmitted from the measuring terminals 10 using time division or time sharing and records the identification numbers in the memory 23, a second identifying function 22c that recognizes an identification number transmitted from a measuring terminal 10 soon after a message has been sent and records the identification number in the memory 23, a function 22d that communicates with individual measuring terminals 10 using the identified identification numbers and downloads measurement data, and a function 22e that displays the downloaded measurement data on the LCD 24 and analyses or interprets the data to find past abnormalities or sudden changes in temperature, etc.

As shown in FIG. 1, the collection terminal 20 of the present embodiment is a "handy-type" terminal that has a large LCD 24 disposed on a front surface 20b. A port 26a for optical communication and a plurality of switches 21a are also disposed on the front surface 20b. In addition, an encoder switch-type jog dial 21b is disposed on one side surface and a connection interface 28a for a personal computer is provided on the opposite side surface.

Figure 4:
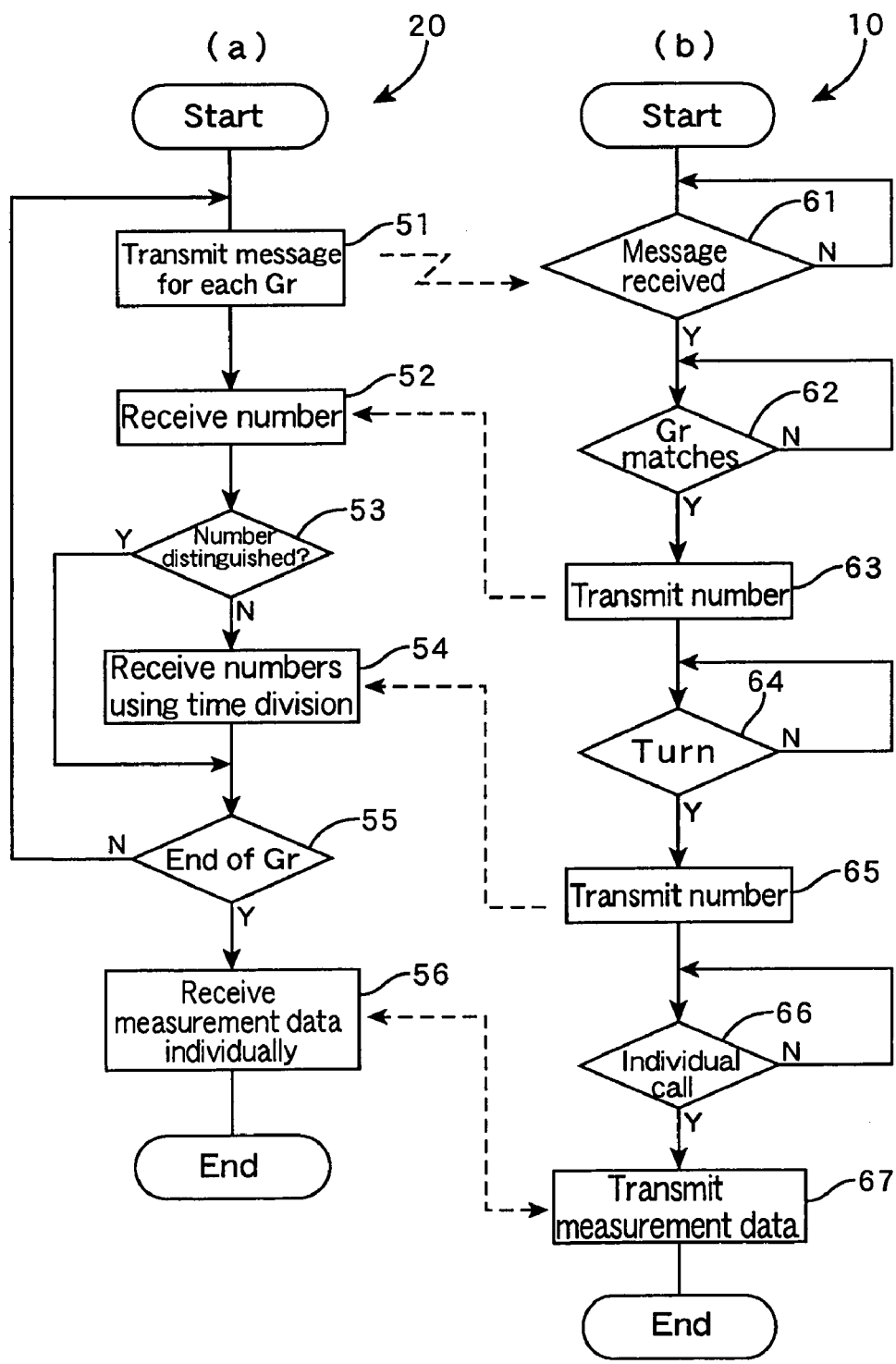
FIG. 4 is a flowchart showing an overview of the process of collecting identification information in the collection system shown in FIG. 1.

FIG. 4 is a flowchart showing an overview of the processing in the collection system 1 of the present embodiment whereby the collection terminal 20 obtains the identification number of each measuring terminal 10 and downloads measurement data from each measuring terminal 10 using the obtained identification numbers. FIG. 4(a) shows the processing of the collection terminal 20 while FIG. 4(b) shows the processing in a measuring terminal 10. In the measuring terminal 10, the processing for measuring temperature, humidity or another physical quantity using the sensor 11, while the process is not shown in the present drawing, is continually executed by the recording function 12a irrespective of the transmission and reception of identification numbers, and executed automatically. In addition, the processing described below can be provided as programs, such as firmware, or program products that are executed by control apparatuses such as the CPUs or microprocessors that control the measuring terminal 10 and the collection terminal 20 described above, with it being possible for such programs or program products to be provided and then used by recording the programs or program products on a suitable recording media such as ROMs.

A plurality of containers 7 are collected at a loading area and are loaded on the truck 9. A measuring terminal 10 is separately provided in each container 7, the temperature, humidity or another environmental quantity inside each container 7 is continuously measured, and measurement data is recorded in the memory 13 of each measuring terminal 10. Even if the containers 7 have the same transportation destination and are subject to some degree of similarities, since the transportation starting points and the transportation routes may differ, there is no guarantee that the containers will have been transported via the same environment. The identification number 13b of the measuring terminal 10 provided in each container 7 cannot be known from outside the containers 7, and it is also difficult to open the containers 7. For this reason, with the data collection system 1 of the present embodiment, before the measurement data is downloaded, in step 51, the collection terminal 20 broadcasts, via the RF wireless unit 25 using the inquiry function 22a, a message inquiring about identification numbers in units of groups.

The communication ranges of the RF wireless unit 25 of the collection terminal 20 and the RF wireless unit 15 of the measuring terminal 10 are limited to an output over several meters or thereabouts which is suited to the deck 8 of a truck. Alternatively, when the message is transmitted, the output is limited. By the wireless unit, it is possible to prevent a message from being sent to the measuring terminals 10 of containers 7 that are stored on another truck or in a warehouse and to obtain the identification numbers 13b of only the measuring terminals 10 in the containers that have been loaded on the deck 8.

Figure 5:
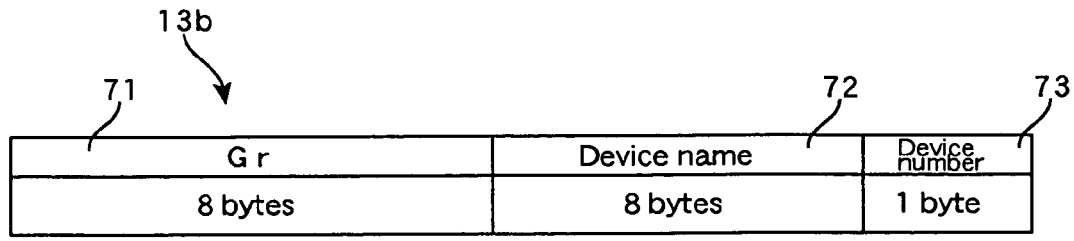
FIG. 5 shows an overview of the identification information.

FIG. 5 shows the composition of the identification information (ID) that is assigned to each measuring terminal 10. The identification information 13b recorded in the memory 13 of each measuring terminal 10 includes information (GrID) 71 that identifies the group to which each measuring terminal (child device) 10 belongs, a name 72 of the measuring terminal, and an identification number (IDNo) 73 that is uniquely assigned to each terminal 10 in the same group. The group information 71 and the identification number 73 make unique identification information for distinguish itself among the measuring terminals. In the present embodiment, information that shows the sender or the receiver can be assigned as the group information 71. Alternatively, information such as the booking date of the goods to be shipped can be used as the group information 71. By appending the group information 71, it is possible to reduce the number or digit of identification numbers 73 that actually identify the measuring terminals 10, and if the group information 71 is also limited to a certain extent, it is possible to obtain the identification information of the measuring terminals 10 in a short time.

Figure 6:
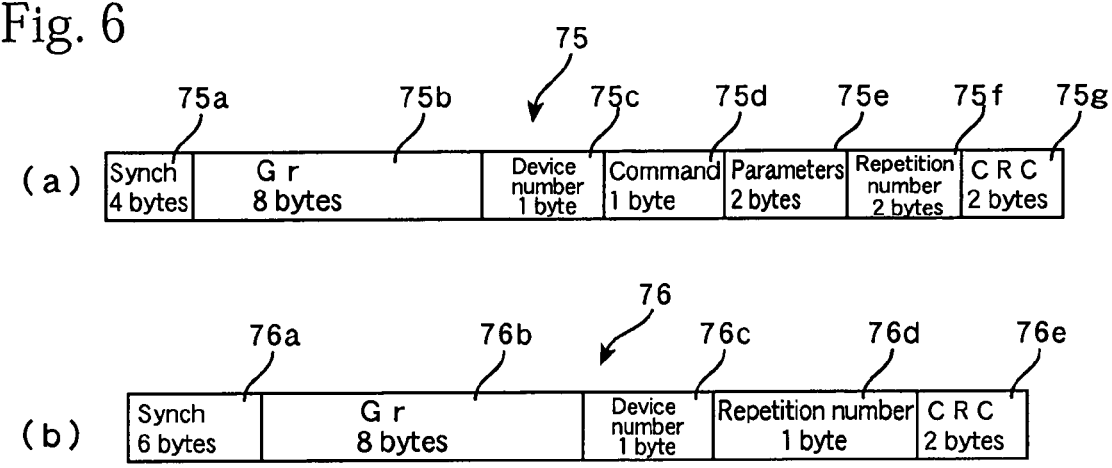
FIG. 6 shows the format of an inquiry message and a reply message.

FIG. 6(a) shows the format of a message 75 that is transmitted by the collection terminal 20. The message 75 includes data for synchronizing 75a, group information 75b of the measuring terminals 10 to which the message 75 is being transmitted, number information 75c that identifies the measuring terminals 10, a command 75d that is transmitted to the measuring terminals 10, parameter information 75e that is appended to the command 75d, a number of cycles 75f that shows the number of times the message 75 is repeatedly transmitted (i.e., a number of repetitions), and a CRC code 75g for error prevention. In the message 75 for inquiring about the identification numbers 73 of the measuring terminals 10 that are provided in the containers 7 that have been loaded on the deck 8 of the truck, the number information 75c is not specified, and data showing that this is an inquiry message is inserted as the command 75d.

In the measuring terminals 10, the consumption of battery power is reduced by intermittently (at intervals of 10 seconds, for example) setting the wireless unit 15 into receive mode. For this reason, in step 51, the message 75 is repeatedly transmitted for 10 seconds or longer, such as for 12 seconds. By decrementing the number of cycles 75f every time the message 75 is repeatedly transmitted, when a measuring terminal 10 receives the message 75, it is possible to calculate the time at which the final message 75 will end. This means that no matter when a message 75 is received, each measuring terminal 10 can understand the meaning of the message 75 and the time at which the repeated transmission of this message 75 will end.

Returning to FIG. 4, on receiving the message 75 in step 61, in step 62 each measuring terminal 10 first judges whether the group information 75b included in the message 75 matches the group information 71 of its own identification information (self identification information) 13b using the interpreting function 12c. When the group information 71 matches, in step 63 the measuring terminal 10 transmits its own identification information 13b a fixed period after the ending of the message 75 using the second responding function 12e. In step 64, using the first responding function 12d the measuring terminal 10 waits until the time period assigned to the identification number 73 of the own identification information 13b is reached and in step 65 transmits the own identification information 13b once again.

FIG. 6(b) shows an example of a reply message 76. The reply message 76 includes data for synchronization 76a, group information 76b and number information 76c of the own identification information 13b that is set in the measuring terminal 10, a number of cycles 76d that shows a number of repetitions for the message 76, and a CRC code 76e for error prevention. The collection terminal 20 can obtain the identification information 13b of a transmitting measuring terminal 10 by receiving this reply message 76 and after the obtainment, can transmit and receive information to and from a specified measuring terminal 10 by transmitting a message in which unique identification information has been set in full.

Figure 7:
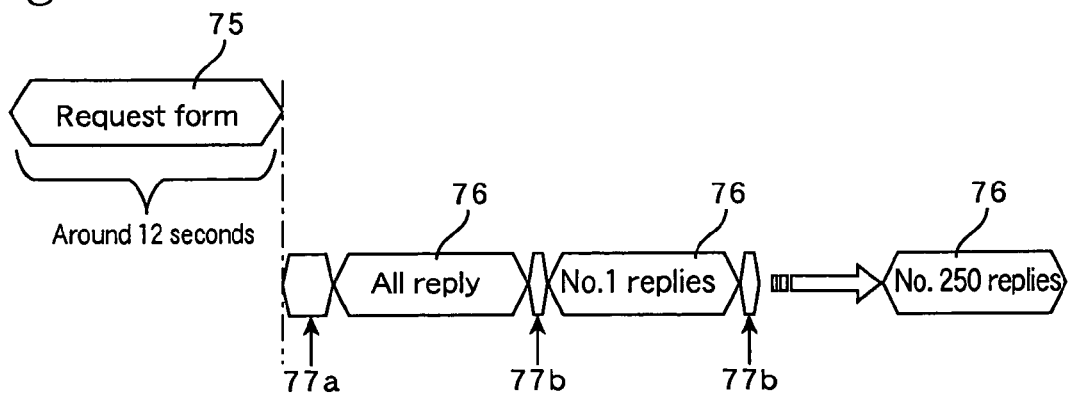
FIG. 7 shows the timing at which reply messages are outputted in response to an inquiry message.

FIG. 7 shows how a message 75 is transmitted from the collection terminal 20 and how a measuring terminal 10 replies. After a message 75 for an inquiry has been transmitted from the collection terminal 20 for around 12 seconds, an appropriate wait time 77a is provided before every measuring terminal 10 simultaneously transmits a reply message 76 that includes its own identification information 13b. In the present embodiment, the inquiry message 75 for each set of group information 71 differs, so that measuring terminals 10 with the same group information 71 transmit their own identification information 13b at the same time. After this, an appropriate wait time 77b is provided and the measuring terminals 10 transmit their own identification information 13b in order starting with the measuring terminal 10 with the lowest identification number 73 in its own identification information 13b. If there is only one measuring terminal 10 corresponding to the group information 71 in the message 75, the collection terminal 20 can obtain the identification information 13b via the reply message 76 that is received following the end of the inquiry message 75, regardless of the identification number 73 in the identification information 13b of that measuring terminal 10. Accordingly, if there is one measuring terminal 10, even if the identification number of this measuring terminal 10 is the final number, which may be "250" for example, the collection terminal 20 can obtain the identification number by the first reply message 76 and can proceed to the next step in the process of obtaining identification information.

On the other hand, if a plurality of measuring terminals 10 correspond to the group information included in the inquiry message 75, the sets of identification information in the first reply messages 76 overlap one another and so cannot be distinguished. However, following this, the identification information 13b of the individual measuring terminals 10 is transmitted in the order of the identification numbers 73, so that the collection terminal 20 can definitely obtain the identification information 13b of each measuring terminal 10 that is on the deck 8 of the truck.

As shown in FIG. 7, an appropriate wait time 77a or guard time 77b is set between the reply messages 76 that are transmitted in order or in turn from the individual measuring terminals 10. Therefore, in the first responding function 12d of each measuring terminal 10, the normal time period that is assigned for each measuring terminal 10 to transmit its own identification information 13b is set as the time that is actually required or needed to transmit the reply message 76 plus the wait or spare time 77b. This wait time 77b is a time period for absorbing differences in the time count in the CPU 12, or in an RTC (real time clock) when it is provided, in the individual measuring terminals 10, and ensures that the reply messages 76 do not overlap one another, not even in part.

Returning to FIG. 4, after having transmitted the inquiry message 75 in step 51, in step 52 the collection terminal 10 receives, using the second identifying function 22c, the reply messages 76 that should arrive together from the measuring terminals 10. Next, in step 53, if the received identification information 13b has been distinguished, only one measuring terminal 10 is included in that group, so that there is no need to proceed to the next step of recognizing the identification information using time sharing transmitting. Accordingly, the first identifying function 22b in step 54 is skipped.

On the other hand, if the received identification information 13b is not distinguished in step 53, a plurality of measuring terminals 10 exist. Accordingly, in step 54, the sets of identification information 13b that are transmitted in turn from the individual measuring terminals 10 using time division are received and recorded in the memory 23 by the first identifying function 22b. Next, in step 55, the above procedure is repeated for a number of times equal to the number of sets of group information 71 that have been set in advance, so that every set of identification information 13b of the measuring terminals 10 in the containers 7 on the deck 8 can be obtained.

In step 56, the downloading function 22d communicates with the individual measuring terminals 10 and the measurement data of the individual measuring terminals 10 is downloaded into the collection terminal 20. In the measuring terminals 10, after the identification information has been transmitted in step 65, in step 66 each terminal waits to be called individually by an inquiry message 75 that uniquely includes its own identification information 13b. On being called, in step 67, the uploading function 12b uploads the past measurement data recorded in the memory 13a. It is also possible to upload the currently measured data to the collection terminal 20.

In the collection terminal 20, using this kind of procedure, it is possible to obtain all of the past and present measurement data from the measuring terminals 10 housed in the containers 7 on the deck 8. The analyzing function 22e analyze the measurement data that has been downloaded into the collection terminal 20, it is possible to confirm whether there have been any abnormalities in the past transportation environment in each container 7. It is also possible to know how the internal temperatures and/or other states of each container 7 on the deck 8 change during transportation. Furthermore, it is possible to transfer the measurement data collected in the collection terminal 20 via the communication interface 28 to a personal computer or the like, with the data being further analyzed or stored.

In the collection system 1 that uses the measuring terminals 10 and the collection terminal 20, the identification information of the measuring terminals 10 provided in the containers 7 is automatically obtained and the measurement data of the measuring terminals 10 can be gathered in the collection terminal 20. Accordingly, changes in the environment of the containers 7 during transportation and during storage can be known from the measurement data without opening the containers 7. It is also possible to automatically collect measurement data from the individual measuring terminals 10 of the containers 7 in units of the deck 8 of a truck or a cargo hold or a warehouse where such containers are held.

Accordingly, it is possible to greatly reduce the time and exertion required to collect the measurement data. Additionally, since it is possible to know the environment in the individual containers 7 via the measuring terminals 10, environmental conditions on a deck or in a cargo hold can be understood at positions that are closer to the goods. Since it is possible to get a more precise understanding of the actual environment close to the goods than in cases where sensors are provided in a number of places on a deck or in a warehouse, the transportation and/or storage environment can be controlled more appropriately and damage to the goods can be prevented from the outset. Also, it is possible to know whether the environment has change abnormally during transportation and/or during storage before a container is opened, so that more appropriate actions can be taken sooner, which makes it possible to provide higher quality services.

By setting the identification information of the measuring terminals 10 associated with the identification data assigned or labeled to the containers 7, it is possible to obtain the identification information of the measuring terminals 10 and to communicate with the measuring terminals 10 individually without opening the containers 7. However, since it is not possible to set the identification information of the measuring terminals 10 until the identification data has been assigned to the containers 7, this gives rise to a situation where it is not possible to seal the containers until the identification data has been assigned to the containers 7, which is not practical. Additionally, even if the identification information of the containers 7 is obtained using a method such as reading bar codes, there is still the need to read the identification information of the individual containers 7, while with the collection system 1 of the present embodiment, it is only necessary to perform a process that inquires about the identification numbers after loading containers onto the deck of a truck or into a cargo hold, so that the identification information of the individual measuring terminals 10 can be obtained extremely easily and in a short time. Since other problems such as input errors do not occur, the measuring terminals 10 can be accessed by the collection terminal 20 and the measurement data can be collected with extremely high reliability.

Since the identification information is transmitted from the measuring terminals 10 using time division, the collection terminal 20 can receive and recognize pieces or sets of identification information that are separated according to time division. Accordingly, it is easy to understand the sets of identification information, so that a simple mechanism or process can recognize the identification information reliably and with high precision and record the identification information in a memory. This means that the collection system 1 of the present embodiment can be constructed with a simple configuration and at low cost, and also has high reliability.

It should be noted that since an example of where the collection system 1 composed of the measuring terminals and the collection terminal 20 is applied to containers that are loaded onto the deck of a truck has been explained, the communication distance for the wireless apparatuses is set at around several meters, though the present collection system can be adapted to a cargo hold or a large warehouse by expanding the communication distance for the wireless apparatuses to around several tens of meters. Also, since identification numbers are assigned to each group by adding group information to the identification information, the measuring terminals 10 can be uniquely identified without increasing the number of identification numbers. Accordingly, it is possible to reduce the time spent by the collection terminal 20 in order to obtain the identification information and it is also possible to uniquely identify the measuring terminals using only the identification numbers without the group information.

Also, the measuring terminals 10 of the present embodiment are described using examples that measure temperature and/or humidity, though the physical quantities that are measured using sensors are not limited to. It is possible with the present collection system to measure a variety of physical quantities and to make use of the resulting data, such as by attaching an acceleration sensor if the goods are sensitive to acceleration or by attaching a photo-sensor if the goods are sensitive to light.

In addition, the technical field in which the collection system and collection method of the present invention can be applied is not limited to the field of transportation, such as container transportation, and the present invention can also be applied to an ordinary data logger system. As one example, in a case where measuring terminals are installed in separate compartments or areas, by operating a collection terminal in each compartment to obtain the identification information of the measuring terminals and collect measurement data, it becomes unnecessary to manage the identification information of the measuring terminals that are installed in each compartment, so that the cost, time and effort required for management can be reduced. In particular, in a case where measuring terminals are temporarily installed in the venues of an event, a significant reduction in costs can be made by using the collection system of the present invention.

Figure 8:
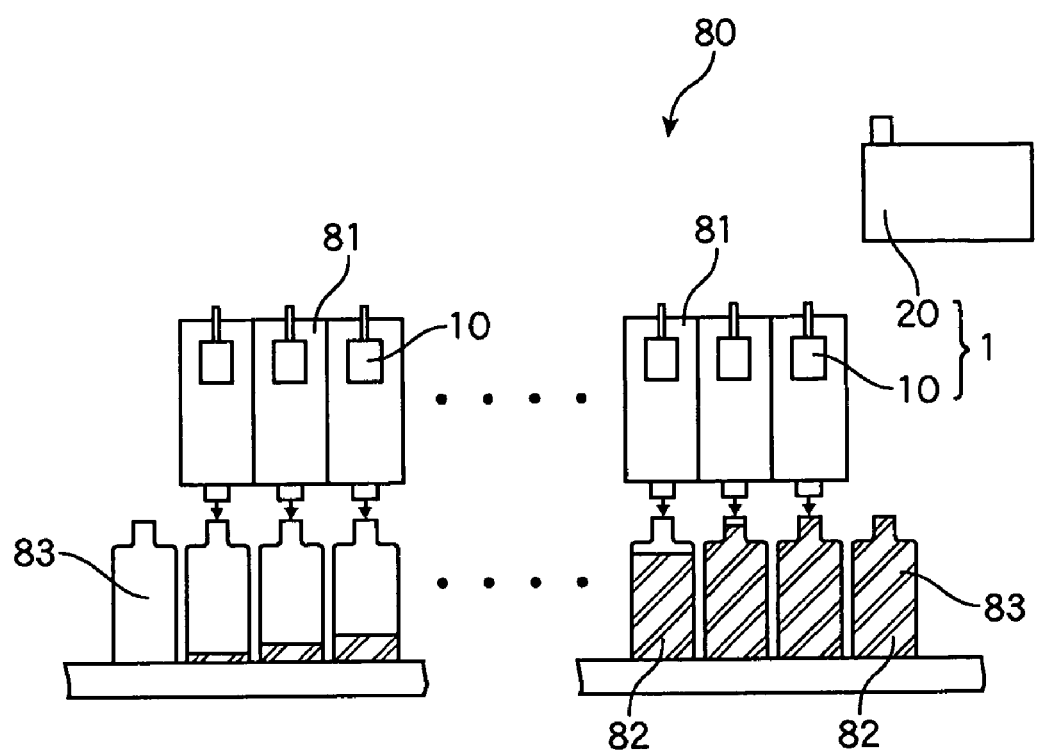
FIG. 8 shows an example that has been applied to a bottling system.

As shown in FIG. 8, the data collection system 1 and data collection method that use the measuring terminals 10 and the collection terminal 20 of the present embodiment are also effective in a bottling system 80 where a liquid 82 is introduced into bottles 83 by a plurality of injectors 81. A measuring terminal 10 is attached to each of the plurality of injectors 81 and the injecting conditions of each injector 81 can be monitored by periodically collecting and recording the temperature of the liquid 82 putted in by the injectors 81, the temperature of the injector 81, etc., and wirelessly sending this data to the collection terminal 20 with appropriate timing. In a system in which a plurality of injectors put a liquid into bottles while moving at high speed, when the measurement information of the individual injectors 81 is obtained each time by polling, it is difficult to keep up with the processing of the injectors 81. On the other hand, by using measuring terminals 10 that are each equipped with a memory capable of storing a certain amount of measurement data or a certain number of measurements, the state of the individual injectors 81 can be recorded first as data into the memory then transferred to the collection terminal 20 with the appropriate timing in a burst mode, so that it is possible to collect and analyze information on the individual injectors 81 in a short period and almost on-time.

For the collection of information of the injectors 81, the identification information may be fixed in advance. However, by using the collection system 1 of the present invention, it is possible to automatically collect identification information- of the individual measuring terminals 10 and/or injectors 81, so that even if the injectors 81 are interchanged in the bottling system 80, data can be collected without having to supply the collection system 1 with the identification information of the injectors 81 and/or measuring terminals 10 that have been interchanged even if interchanges take place. When interchanging has taken place or the configuration of the bottling system 80 has been changed, the collection system 1 can automatically recognize the configuration of the bottling system 80 by inquiring about identification information of the measuring terminals 10. Accordingly, it is possible with the collection system 1 of the present invention to automatically perform management including histories for the injectors 81. By analyzing the data obtained by the collection system 1, it is possible to quickly discover any abnormalities in the individual injectors 81, which makes it possible to prevent the occurrence of rejected lots. It becomes possible to prevent waste, so that products of a stable quality can be shipped at low cost.

Additionally, by using the measuring terminals of the present invention, the conditions of the measuring terminals can be flexibly set by an optical communication means at any time, for example when the measuring terminals are attached to the place of installation or when the measuring terminals are inserted into packages. Accordingly, it is possible to make the settings freely in accordance with a user system that uses the measuring terminals, so that the advantages of introducing the measuring terminals can be obtained without changing the user system.

The above-described data collection method and data collection system can easily obtain the identification information of measuring terminals, which are installed inside containers or the like, through communication between the measuring terminals and a collection terminal and after this can collect the measurement data of the measuring terminals in the collection terminal by communicating with the measuring terminals using the obtained identification information. Accordingly, it is possible to provide a collection system that can control, without opening the containers, the temperature in the containers using the measurement data of the measuring terminals and can judge beforehand whether there are any abnormalities in the containers. In addition to being effective in the field of transportation using containers and the like, the data collection method and system of the present invention are effective in other fields, for example, the field of packaging foodstuffs and beverages, such as in a bottling system. Additionally, since it is not necessary to register the measuring terminals in the collection terminal in advance, the present method and system are especially useful for data collection in fields where measuring terminals are dispersed and interchanged. The method and system have a wide range of application, such as for monitoring the state of the exhibits and for monitoring the state of provided services at an event venue, an art gallery, a showroom, etc.

What is claimed is:

1. A data collection method that uses measuring terminals, each of the measuring terminals obtains measurement data from a sensor and wirelessly transmits the measurement data, and a collection terminal for receiving the measurement data from the measuring terminals, each of the measuring terminals having a memory for storing one of a limited number of sets of identification information, whose order is definable, as own identification information, the data collection method comprising:

(a) the collection terminal wirelessly transmits a message for inquiring about own identification information;

(b) at least one of the measuring terminals, after receiving the message, wirelessly transmits the own identification information after the message has ended, during a turn for sending the own identification information;

(c) the collection terminal stores the own identification information in the order of identification information; and (d) the collection terminal wirelessly communicates individually with the measuring terminals with the own identification information stored and collects the measurement data from the measuring terminals.

2. The data collection method according to claim 1, wherein each own identification information includes first identification information for defining order and second identification information for identifying a group, in step (a), the message including the second identification information is transmitted, and in step (b), the measuring terminals whose own identification information includes the second identification information included in the message reply to the message.

3. The data collection method according to claim 1, wherein in step (a), a same message is transmitted a plurality of times together with a number of repetitions.

4. The data collection method according to claim 1, wherein in step (b), the turn for transmitting the own identification information is counted using a normal time for transmitting one set of identification information, the normal time being a total of a time needed to transmit the one set of identification information plus spare time.

5. The data collection method according to claim 1, further comprising:
(e) before step (b), every measuring terminal wirelessly transmits the own identification information simultaneously following an end of the message; and
(f) when a set of identification information is identified in step (e), the set of identification information is stored and step (c) is skipped.

6. A measuring terminal comprising:
a circuit for obtaining measurement data from a sensor;
a wireless apparatus for transmitting the measurement data;
a memory for storing one of sets of identification information, whose order are definable, as own identification information; and
wherein the wireless apparatus is adapted to transmit the own identification information when a message inquiring about identification information has been received via the wireless apparatus and a turn for transmitting the own identification information has been reached following an end of the message.

7. The A measuring terminal according to claim 6, wherein the wireless apparatus is adapted to transmit the own identification information a predetermined time after the end of the message and before the first responding means replies.

8. The measuring terminal according to claim 6, further comprising an optical communication means for receiving data for setting conditions for transmitting and receiving via the wireless apparatus.

9. A collection terminal, comprising:
a wireless apparatus for receiving measurement data from measuring terminals for obtaining the measurement data from sensors;
the wireless apparatus is adapted to transmit to the measuring terminals a message that inquires about identification information; and
a memory that stores sets of identification information received via the wireless apparatus in an order of the sets of identification information after an end of the message,
wherein the wireless apparatus is adapted to communicate with the measuring terminals individually with the sets of identification information stored and collects the measurement data from the measuring terminals.

10. The collection terminal according to claim 9, wherein the wireless apparatus is adapted to transmit a same message a plurality of times together with a number of repetitions.

11. The collection terminal according to claim 9, further comprising a second identifying means for receiving via the wireless apparatus, following the end of the message, the sets of identification information that are simultaneously transmitted from every measuring terminal and, when a set of identification information is identified, storing the set of identification information and skipping an operation of the first identifying means.

12. A data collection system including measuring terminals, each measuring terminal obtains measurement data from a sensor and wirelessly transmits the measurement data, and a collection terminal for receiving the measurement data from the measuring terminals,
the measuring terminal comprising:
a measuring terminal wireless apparatus for wirelessly transmitting the measurement data;
a memory for storing one of sets of identification information, whose order is definable, as own identification information; and
wherein the measuring terminal wireless apparatus is adapted to wirelessly transmit the own identification information when a message inquiring about identification information has been wirelessly received and a turn for sending the own identification information of the measuring terminal has been reached following an end of the message, and
the collection terminal comprising:
a collection terminal wireless apparatus for receiving the measurement data from the measuring terminals wirelessly and for transmitting, wirelessly to the measuring terminals, the message that inquires about identification information; and
a memory for storing the sets of identification information wirelessly received in the order of the sets of identification information following the end of the message,
wherein the collection terminal wireless apparatus is adapted to communicate with the measuring terminals individually with the sets of identification information sets stored and collects the measurement data from the measuring terminals.

13. A computer readable medium having a program that controls a measuring terminal for obtaining measurement data from a sensor and transmitting the measurement data via a wireless apparatus,
wherein one of a limited number of sets of identification information, whose order is definable, is stored in a memory as own identification information,
the program comprising an instruction that executes a step of transmitting, when a message inquiring about identification information has been received via the wireless apparatus, the own identification information via the wireless apparatus when, after the message has ended, a turn for sending the own identification information is reached.

14. The program according to claim 13, wherein the measuring terminal includes optical communication means and the program further comprises an instruction that executes a step of setting the own identification information using the optical communication means.

15. A computer readable medium having a program that controls a collection terminal for receiving measurement data via a wireless apparatus from measuring terminals for obtaining the measurement data from sensors,
the program comprising instructions for executing a method comprising:
transmitting, via the wireless apparatus to the measuring terminals, a message that inquires about identification information;
storing, following an end of the message, sets of identification information received via the wireless apparatus in an order of the sets of identification information; and
communicating via the wireless apparatus with the measuring terminals individually with the sets of identification information stored and collecting the measurement data from the measuring terminals.

* * * * *